United States Patent
Luo et al.

(10) Patent No.: US 10,116,212 B2
(45) Date of Patent: Oct. 30, 2018

(54) VOLTAGE REGULATION BASED ON CURRENT SENSING IN MOSFET DRAIN-TO-SOURCE RESISTANCE IN ON-STATE RDS(ON)

(71) Applicant: DELL PRODUCTS, L.P., Round Rock, TX (US)

(72) Inventors: Shiguo Luo, Austin, TX (US); Kejiu Zhang, Round Rock, TX (US); Ralph H. Johnson, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 15/457,906

(22) Filed: Mar. 13, 2017

(65) Prior Publication Data

US 2018/0262108 A1  Sep. 13, 2018

(51) Int. Cl.
| | |
|---|---|
| G05F 3/02 | (2006.01) |
| H03K 3/012 | (2006.01) |
| H02M 3/158 | (2006.01) |
| H02M 1/088 | (2006.01) |
| G06F 1/26 | (2006.01) |
| H02M 1/00 | (2006.01) |

(52) U.S. Cl.
CPC .............. *H02M 3/158* (2013.01); *G06F 1/26* (2013.01); *H02M 1/088* (2013.01); *H02M 2001/0009* (2013.01)

(58) Field of Classification Search
CPC combination set(s) only.
See application file for complete search history.

(56) References Cited

U.S. PATENT DOCUMENTS

| | | | |
|---|---|---|---|
| 5,982,160 A | * 11/1999 | Walters | H02M 3/156 323/222 |
| 6,946,897 B2 | 9/2005 | Pearce | |
| 6,998,824 B2 | * 2/2006 | Nishimaki | H02M 1/38 323/222 |
| 7,334,418 B2 | 2/2008 | Henry et al. | |
| 7,358,710 B2 | 4/2008 | Luo et al. | |
| 7,464,277 B2 | 12/2008 | Prosperi et al. | |
| 7,615,973 B2 | * 11/2009 | Uehara | G06G 7/14 323/224 |
| 8,004,263 B2 | * 8/2011 | Hirata | H02M 3/156 323/285 |
| 8,378,655 B2 | * 2/2013 | Larson | H02M 1/36 323/284 |
| 8,451,153 B1 | 5/2013 | Lakshmikanthan et al. | |
| 8,734,006 B2 | 5/2014 | Crafts et al. | |
| 8,959,377 B2 | 2/2015 | Li | |

(Continued)

*Primary Examiner* — An Luu
(74) *Attorney, Agent, or Firm* — Isidore PLLC

(57) ABSTRACT

A direct current (DC) power supply system performs a method of delivering electrical energy by a synchronous buck voltage regulator (VR) coupled to an information handling resource of an information handling system by switching between a high side (HS) control switch and a low side (LS) synchronous switch to regulate a direct current (DC) output voltage (VOUT) generated from an input voltage (VIN). Inductor current (IMON) values of the voltage regulator are measured during LS synchronous switch ON state. IMON values of the voltage regulator are synthesized during HS power switch ON state. A complete inductor current signal is generated that combines the measured and synthesized IMON values.

20 Claims, 9 Drawing Sheets

(56) References Cited

U.S. PATENT DOCUMENTS

2009/0146635 A1 6/2009 Qiu et al.
2011/0109373 A1 5/2011 Chen et al.
2016/0116549 A1 4/2016 Mathew et al.

* cited by examiner

VOLTAGE REGULATION BASED ON CURRENT SENSING IN MOSFET DRAIN-TO-SOURCE RESISTANCE IN ON-STATE RDS(ON)

BACKGROUND

1. Technical Field

The present disclosure relates in general to current sense and digital control of a voltage regulator (VR), and more particularly to current sense and control of a VR of an IHS.

2. Description of the Related Art

As the value and use of information continue to increase, individuals and businesses seek additional ways to process and store information. One option available to users is information handling systems (IHSs). An IHS generally processes, compiles, stores, and/or communicates information or data for business, personal, or other purposes, thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

An IHS may include a voltage regulator to provide a constant voltage level and a current to power the system. For example, a voltage regulator may receive an input voltage and produce an output current at a predetermined output voltage required by a load, such as components of the IHS that require electrical power. Moreover, modern IHSs may include components that maintain current requirements across a broad range, from relatively high peak currents to very low stable currents. More particularly, voltage regulators may be required to maintain a high efficiency, or low power loss, over such ranges.

Servers are requiring ever increasing accuracy of power telemetry data used in system level power and thermal management algorithms. For example, the central processing unit (CPU) power management algorithms poll CPU load current information from the CPU core voltage (Vcore) Voltage Regulator (VR). CPU load current information is used to optimize CPU performance versus power consumption, while still maintaining safe operation of the system. Power measurement is required from an INTEL VR13.0 standard compliant VR with data reported over the serial voltage identification (SVID) bus. Accuracy of current sense directly impacts system performance, reliability, and power saving. Therefore, tighter current-sense accuracy targets are expected for a next generation of servers. For example, accuracy within ±3% will be pursued for load range of 30%-100%. In support of this accuracy target, an inductor monitored current (IMON) accuracy goal of 2% is contemplated. However, attaining such accuracy to improve system performance using generally-known techniques greatly impacts the cost of power infrastructure of an IHS.

Traditionally, an inductor direct current resistance (DCR) sensing scheme is widely adopted in industry due to lower cost and maturity than alternative approaches. However, the DCR based sensing scheme is difficult to meet the ever increasing accuracy demand for existing and future applications. The very low signal-to-noise ratio (SNR) requires high precision low offset amplifiers that increase cost. The DCR-based IMON reporting is also impacted by manufacturing, tolerance of the inductor and undesired thermal compensation.

BRIEF SUMMARY

In accordance with the teachings of the present disclosure, an information handling system (IHS) includes a synchronous buck voltage regulator (VR) coupled to an information handling resource of the IHS. The VR delivers electrical energy to the information handling resource by switching between a high side (HS) control switch and a low side (LS) synchronous switch to regulate a direct current (DC) output voltage (VOUT) generated from a DC input voltage (VIN). A VR controller is coupled to the voltage regulator. The VR controller measures at least one inductor current (IMON) value of the voltage regulator during LS synchronous switch ON state. The VR controller synthesizes one or more IMON values of the voltage regulator during HS power switch ON state. The VR controller generates a complete IMON signal that combines the measured and synthesized IMON values. Synthesizing IMON signals during the relatively short but noisy portions of the VR operation enhances accuracy and avoids controller complexity.

In accordance with embodiments of the present disclosure, a DC power supply system includes a synchronous buck VR coupled to an information handling resource to deliver electrical energy to the information handling resource. The VR delivers the electrical energy by switching between a HS control switch and a LS synchronous switch to regulate a DC VOUT generated from a DC VIN. A VR controller is coupled to the voltage regulator. The VR controller measures at least one IMON value of the voltage regulator during LS synchronous switch ON state. The VR controller synthesizes one or more IMON values of the voltage regulator during HS power switch ON state. The VR controller generates a complete IMON signal that combines the measured and synthesized IMON values.

According to illustrative embodiments of the present disclosure, a method includes delivering electrical energy by a synchronous buck VR coupled to an information handling resource of an information handling system. The VR delivers electrical energy by switching between a HS control switch and a LS synchronous switch to regulate a DC VOUT generated from a VIN. The method includes measuring IMON values of the voltage regulator during LS synchronous switch ON state. The method also includes synthesizing IMON values of the voltage regulator during HS power switch ON state. Additionally, the method includes generating a complete inductor current signal that combines the measured and synthesized IMON values.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
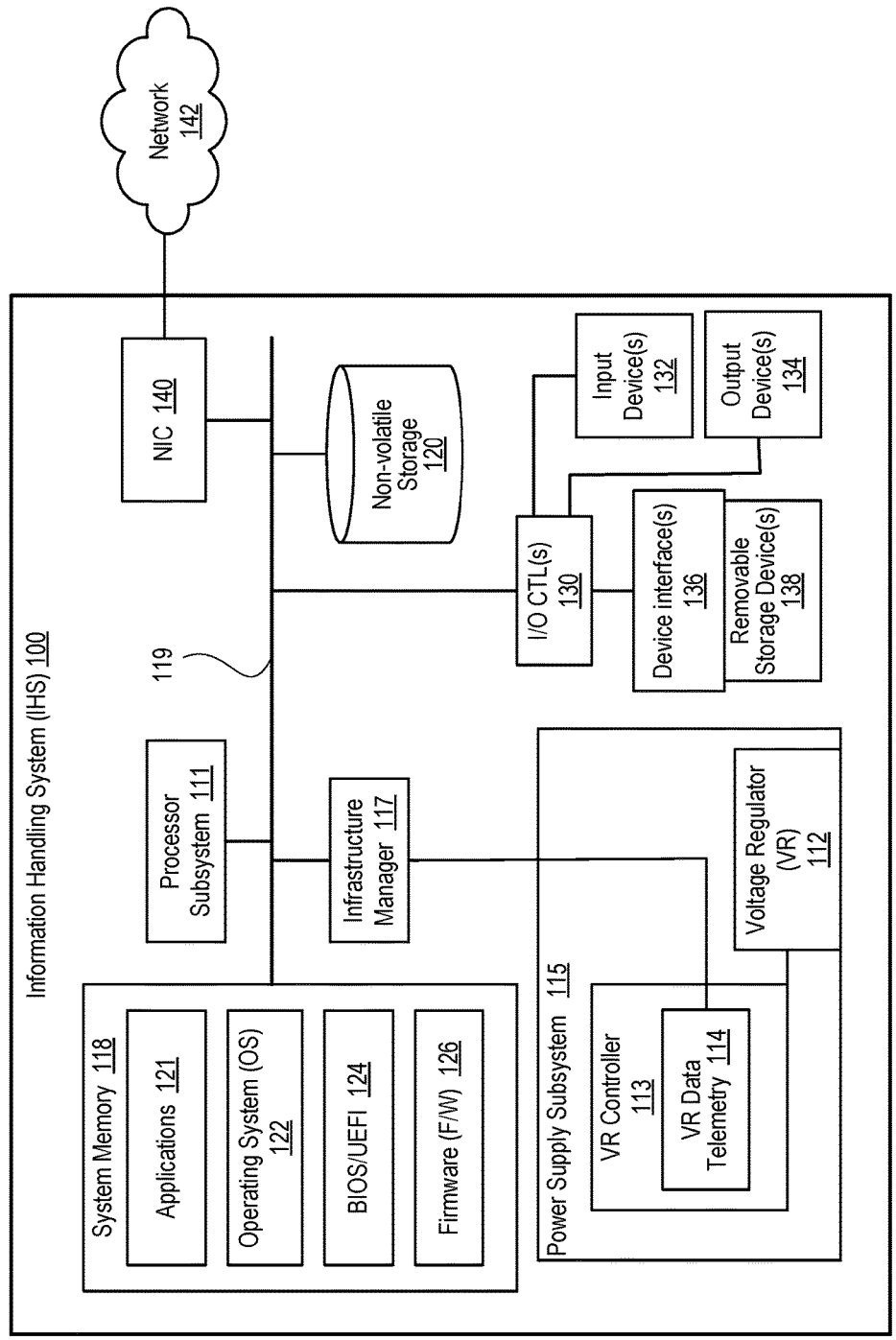
FIG. 1 illustrates a block diagram representation of an example information handling system (IHS) having computing components that are powered by a voltage regulator (VR) module, according to one or more embodiments.

A direct current (DC) power supply system performs a method of delivering electrical energy by a synchronous buck voltage regulator (VR) coupled to an information handling resource of an information handling system by switching between a high side (HS) control switch and a low side (LS) synchronous switch to regulate a direct current (DC) output voltage (VOUT) generated from an input voltage (VIN). Inductor current (IMON) values of the voltage regulator are measured during LS synchronous switch ON state. IMON values of the voltage regulator are synthesized during HS power switch ON state. A complete inductor current signal is generated that combines the measured and synthesized IMON values, providing a cost-effective approach for increasing accuracy of inductor current sensing for power supply management within an information handling system (IHS).

In one or more embodiment, the present innovation provides a current sense scheme for metal oxide-semiconductor-field-effect-transistors (MOSFET) drain-to-source resistance in an on state RDS (on) sense based voltage regulator (VR). Implementing an overall current-sense design is prohibitive due to performance limitations and high cost. Attempting to measure a whole continuous current waveforms that are generated by real-time circuitry is challenging due to the amount of intelligence that is required of a power stage (Pstage) to handle the complexity of certain corner cases. Moreover, with the smaller duty cycles of high-side switch (HS) FET on time in typical server central processing unit (CPU) VR applications, the HS FET on time measured inductor current (IMON) signal is more likely to be more corrupted by switching noise than the much longer low side switch (LS) FET on time.

In one or more embodiments, a direct current to direct current (DC-DC) voltage regulator may include a controller, one or more drivers, and one or more power stages. Furthermore, a Pstage may include one or more MOSFETs, which may be driven by the drivers. Implementing smart power stage (Pstage) has benefits including a stronger current sensed signal, higher accuracy during dynamic thermal environment, and higher power density and efficiency. In order to report instantaneous load current and fast per-phase current control, Pstages generates continuous current waveforms including current flowing during high-side (HS) Field Effect Transistor (FET) ON, low-side (LS) FET ON and commutation. Commutation refers to current flowing through body diode during dead-time or body brake. The real-time continuous current waveforms requirement adds the complexity to driver design. More complex driver designs prolong the design cycle and production time and thus increases the cost. Another cause of complexity arises from noise coupled on the waveforms. the VR controller is required to filter or otherwise ignore the noise spikes, which adds another layer of complexity.

The present innovation recognizes an opportunity to avoid the complexity of measuring and filtering the IMON signal during HS FET on time. In particular, since the LS FET conducts longer as compared to the switching event times, the switching noise event time is a much smaller percentage of the total on time. The noise has time to die down and thus the signal fidelity is cleaner and better data is acquired during the inductor current downslope. As a result, there is a desire to operate only with the live IMON signal from the LS FET during its on time. From the system reliability point of view, HS IMON sensing circuit in Pstage requires a tight VCC window (usually above 4.5V) to generate reliable waveforms. The VR controller's synthesizing of IMON during HS power switch ON greatly improves the system reliability. For example, an extreme corner case can occur with the output of a 5V VR that is out of the required window during HS power switch ON. Attempting to measure IMON during HS power switch ON in this situation can jeopardize the system overall reliability.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others.

Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 illustrates a block diagram representation of an example information handling system (IHS) 100 having computing components such as a processor subsystem 111 that are powered by a voltage regulator (VR) 112. A VR controller 113 executes VR data telemetry utility 114 that cost-effectively performs a current sense scheme for MOSFET RDS (on) sense based VR 112. VR controller 113 measures inductor current (IMON) during certain phases of switching operation, and VR controller 113 synthesizes IMON during other phases of switching operation that are noisy and thus difficult to detect and filter. Acting in concert, the VR controller 113 and VR 112 provide a power supply subsystem 115. The complete IMON signal that includes both measured and synthesized values can be used by an infrastructure manager 117 for purposes such as power management and thermal management.

Within the general context of IHSs, the IHS 100 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring again to FIG. 1, IHS 100 includes at least one central processing unit (CPU) or processor subsystem 111 coupled to a system memory 118 via a system interconnect 119. System interconnect 119 can be interchangeably referred to as a system bus, in one or more embodiments. Also coupled to system interconnect 119 is non-volatile storage (e.g., a non-volatile random access memory (NVRAM)) 120, within which can be stored one or more software and/or firmware modules and one or more sets of data that can be utilized during operations of management IHS 100. These one or more software and/or firmware modules can be loaded into system memory 118 during operation of management IHS 100. Specifically, in one embodiment, system memory 118 can include therein a plurality of such modules, including one or more of application(s) 121, operating system (OS) 122, basic input/output system (BIOS) or Uniform Extensible Firmware Interface (UEFI) 124, and firmware (F/W) 126. These software and/or firmware modules have varying functionality when their corresponding program code is executed by processor subsystem 111 or secondary processing devices within management IHS 100. For example, application(s) 121 may include a word processing application, a presentation application, and a management station application, among other applications.

IHS 100 further includes one or more input/output (I/O) controllers 130 which support connection by and processing of signals from one or more connected input device(s) 132, such as a keyboard, mouse, touch screen, or microphone. I/O controllers 130 also support connection to and forwarding of output signals to one or more connected output devices 134, such as a monitor or display device or audio speaker(s). Additionally, in one or more embodiments, one or more device interfaces 136, such as an optical reader, a USB, a card reader, Personal Computer Memory Card International Association (PCMCIA) slot, and/or a high-definition multimedia interface (HDMI), can be associated with IHS 100. Device interface(s) 136 can be utilized to enable data to be read from or stored to corresponding removable storage device(s) 138, such as a compact disk (CD), digital video disk (DVD), flash drive, or flash memory card. In one or more embodiments, device interface(s) 136 can further include general purpose I/O interfaces such as inter-integrated circuit ($I^2C$), system management bus (SMB), and peripheral component interconnect (PCI) buses.

IHS 100 comprises a network interface controller (NIC) 140. NIC 140 enables IHS 100 and/or components within IHS 100 to communicate and/or interface with other devices, services, and components that are located external to IHS 100. These devices, services, and components can interface with IHS 100 via an external network, such as example network 142, using one or more communication protocols that include transport control protocol/Internet protocol (TCP/IP) and network block device (NBD) protocol. Network 142 can be a local area network, wide area network, personal area network, and the like, and the connection to and/or between network and IHS 100 can be wired, wireless, or a combination thereof. For purposes of discussion, network 142 is indicated as a single collective component for simplicity. However, it should be appreciated that network 142 can comprise one or more direct connections to other devices as well as a more complex set of interconnections as can exist within a wide area network, such as the Internet.

Figure 2:
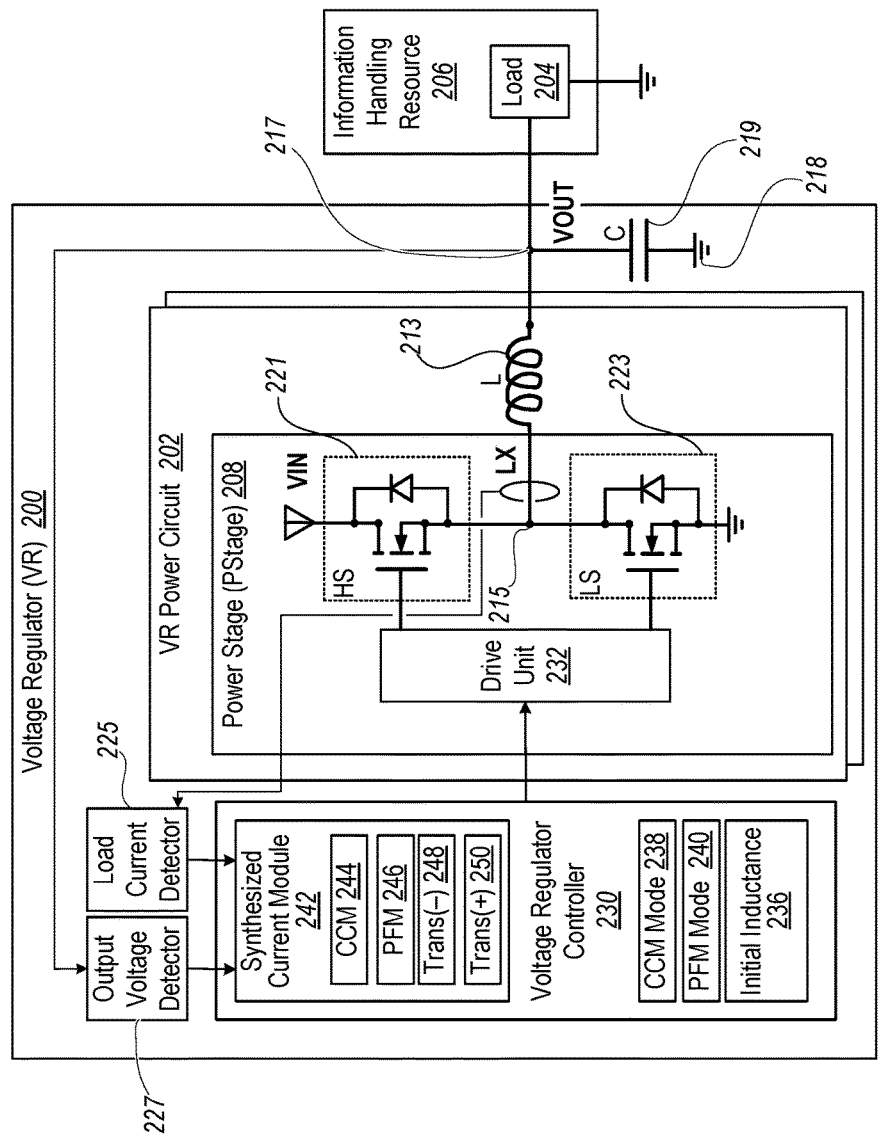
FIG. 2 illustrates a block diagram representation of an example $I_{[LS1]}$ voltage regulator of the IHS of FIG. 1, according to one or more embodiments.

FIG. 2 illustrates a voltage regulator (VR) 200 having a VR power circuit 202 that can be utilized within example IHS 100 (FIG. 1) to power a load 204 of an information handling resource 206. Information handling resource 206 can include power consuming components such as processor subsystem 111, system memory 118, non-volatile storage 120, I/O controllers 130, etc. (FIG. 1). Each power stage (Pstage) 208 of the VR power circuit 202 can produce a desired voltage level or portion of power required at a particular voltage level. In one or more embodiments, VR power circuit 202 is a synchronized Buck VR power circuit 202 that includes an inductor (L) 213 electrically connected between a phase node 215 and an output node 217. A capacitor (C) 219 is electrically connected between the output node 217 and ground (GND) 218. A high side control switch (HS) 221 is electrically connected between an input voltage from a power supply (VIN) and the phase node 215. A low side synchronous switch (LS) 223 is electrically connected between a ground (GND) 218 and phase node 215. A load current sensor 225 senses the load current value by either (a) an inductor DC resistance (DCR) method or (b) an LS drain-to-source resistance in an on state RDS (on) method. An output voltage sensor 227 is electrically connected across the output node 217 and ground (GND) 218 to detect an output voltage value. A VR controller 230 is placed in electrical connection with the HS 221, the LS 223, the load current sensor 225, and the output voltage sensor 227. VR controller 230 receives and/or transmits signals to/from these components to regulate the output voltage value across the capacitor 219 by switching on and off the HS 221 and LS 223 to cause an inductor current ripple through the inductor 213. Given the various transfers of signals and information, for purposes of the disclosure, the VR controller 230 is described as being in electrical communication with these various components. In one embodiment, the VR controller 230 communicates with the load current detector 225 that detects the load current value (IMON) at phase node 215. The VR controller 230 communicates with the output voltage detector 227 that detects the voltage output value of the synchronous Buck VR 204 at output node 217. In response to detecting an electrical characteristic indicative of an overshoot (i.e., overshoot of the output voltage), the VR controller 230 can drive the synchronous Buck VR 204 in a forced continuous conduction mode (FCCM). During Dynamic voltage identification (VID) down, or some cases of load transient, VR controller 230 causes a drive unit 232 to drive the HS 221 and LS 223 to operate in a manner that sinks the load current each switching cycle.

In one embodiment, the VR controller 230 can access initial inductive values 236 such as in a configuration file that is locally stored in VR controller 230 or remotely accessible to the VR controller 230. Depending on load conditions, VR controller 230 can utilize a CCM mode 238 and a pulse frequency modulation (PFM) mode 240 to operate the drive unit 232 in the corresponding modes. PFM provides power saving operation to maintain high efficiency during light loads. Generally, the VR controller operates with pulse width modulation (PWM mode) at medium to heavy loads. In synthesizing IMON values as required, a synthesized current module 242 of the VR controller 230 can access criteria to determine whether the VR power circuit 202 is in one of the following states: CCM state criteria 244, PFM state criteria 246, transitioning with a negative load current state criteria 248, and transitioning with a positive load current state criteria 250.

The innovative system and method described herein present a low-cost but robust solution for VR digital controller and key data telemetry. Three illustrative scenarios that require controller intelligence for synthesizing IMON values are illustrated in the following description. Additional procedures may be completed by digital VR controller as the controller's intelligence is enhanced. The presented methods optimize the current reporting scheme and better utilize existing system resource from a system point of view. The presented methods only require current information from Pstage during LS FET ON, greatly simplifying circuitry complexity and reducing the need for HS current sense. The proposed methods addresses the concerns of the cost sensitive platforms, or rails, without sacrificing the performance.

Figure 3:
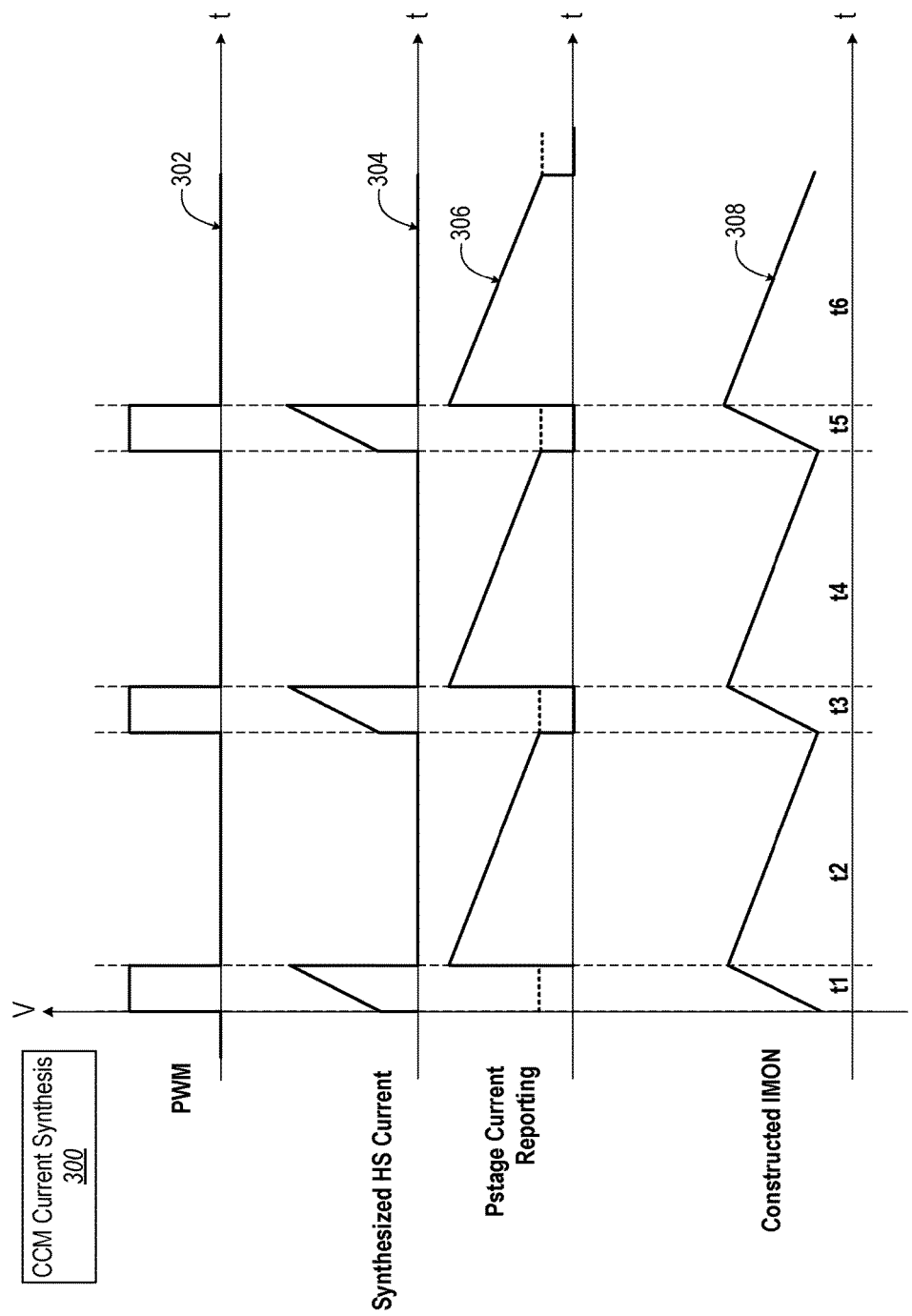
FIG. 3 illustrates graphical plots of a first scenario of current synthesis during continuous conduction mode (CCM) operation, according to one or more embodiments.

FIG. 3 illustrates a first scenario 300 of current synthesis during continuous conduction mode (CCM) operation. Provided within FIG. 3 are a PWM plot 302, a synthesized HS current plot 304, a Pstage current reporting plot 306, and a constructed IMON plot 308. In CCM operation, the VR controller uses initial inductance from the configuration file, measured Vin and VOUT in the real-time manner, and ON time (t1, t3, t5) to synthesize the inductor current of positive slope. The VR controller uses VOUT and inductance to generate the negative slope for a period of time, then smooths transition to the measured current. In PWM OFF time (t2, t4, t5), VR controller 230 (FIG. 2) samples a few points of current information from Pstage to calculate the real inductance and continuously updates the inductance value in each switching cycle to adaptively correct for errors in the synthesized current in the HS FET on time. Before the PWM off time expires, the VR controller 230 (FIG. 2) transitions the computation mode to synthesize the transition period and the inductor waveform of the next cycle during HS FET ON. For Pstage current reporting, the VR controller 230 (FIG. 2) can either report zero during PWM ON, or can hold the previous IMON value for consumption by components such as infrastructure manager 117 (FIG. 1). Either way, the VR controller 230 (FIG. 2) ignores the reported information during PWM ON for power control purposes.

Figure 4:
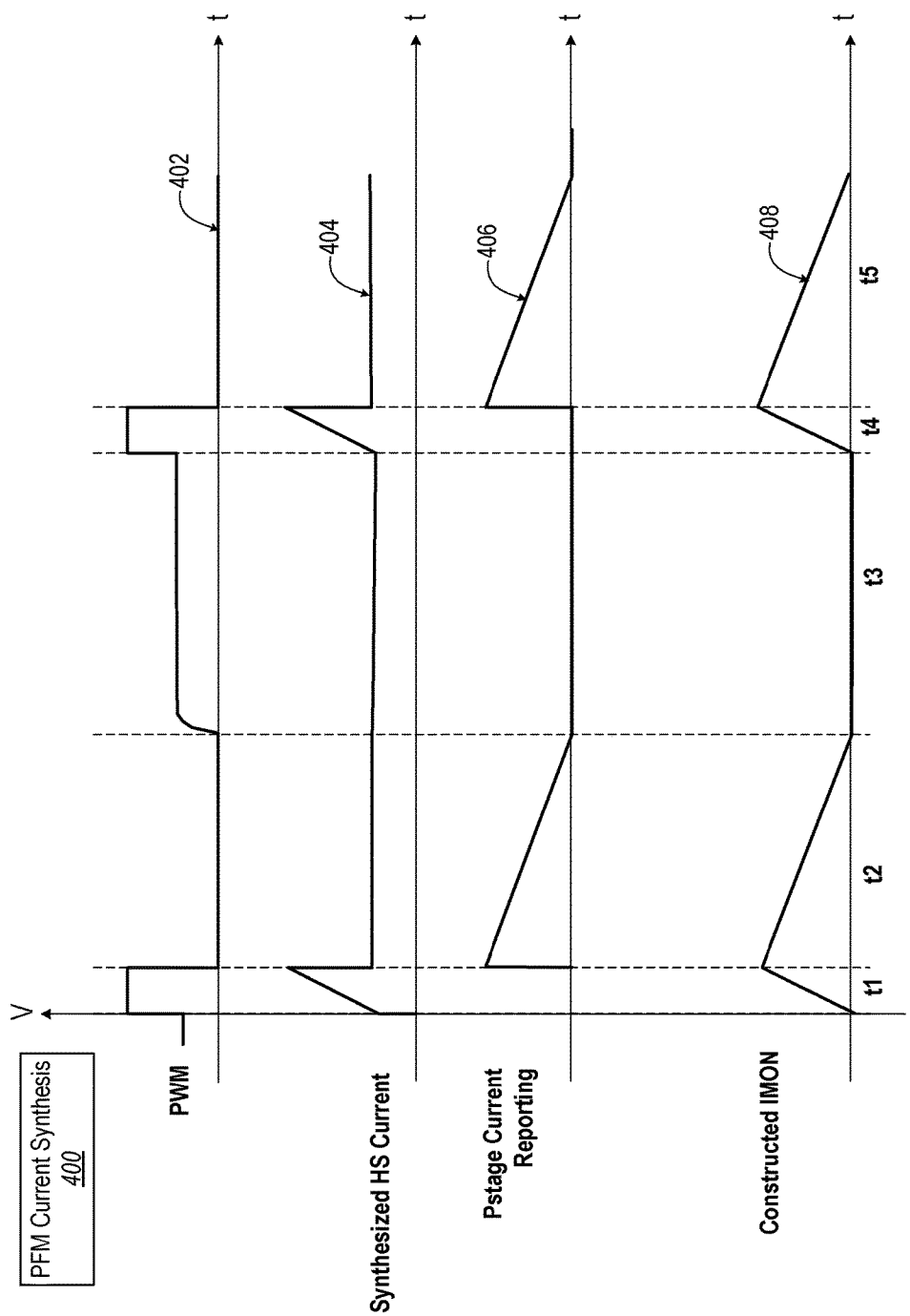
FIG. 4 illustrates graphical plots of a second scenario of current synthesis during pulse frequency modulation (PFM) operation, according to one or more embodiments.

FIG. 4 illustrates current synthesis in pulse frequency modulation (PFM) current synthesis mode plots 400 that is used to save power during light load. PFW current synthesis mode plots 400 includes a PWM plot 402, a synthesized HS current plot 404, a Pstage current reporting plot 406, and a constructed IMON plot 408. In PFM operation, the VR controller 230 (FIG. 2) issues a programmed PWM ON pulse (t1, t4) and synthesizes the up slope current simultaneously by knowing VIN, VOUT, and the initial inductance. Since each current pulse is a discontinuous current ripple, the VR controller 230 (FIG. 2) can either synthesize the current down slope or use the IMON from Pstage. During the down slope (t2, t5), the VR controller 230 (FIG. 2) can still slightly modify the inductance value. The method is the same as described in CCM. During PWM high impedance (Hi-z) state (t3), there is no current and controller reports zero current. The next PWM pulse is issued if the VOUT is below the programmed voltage threshold.

Figure 5:
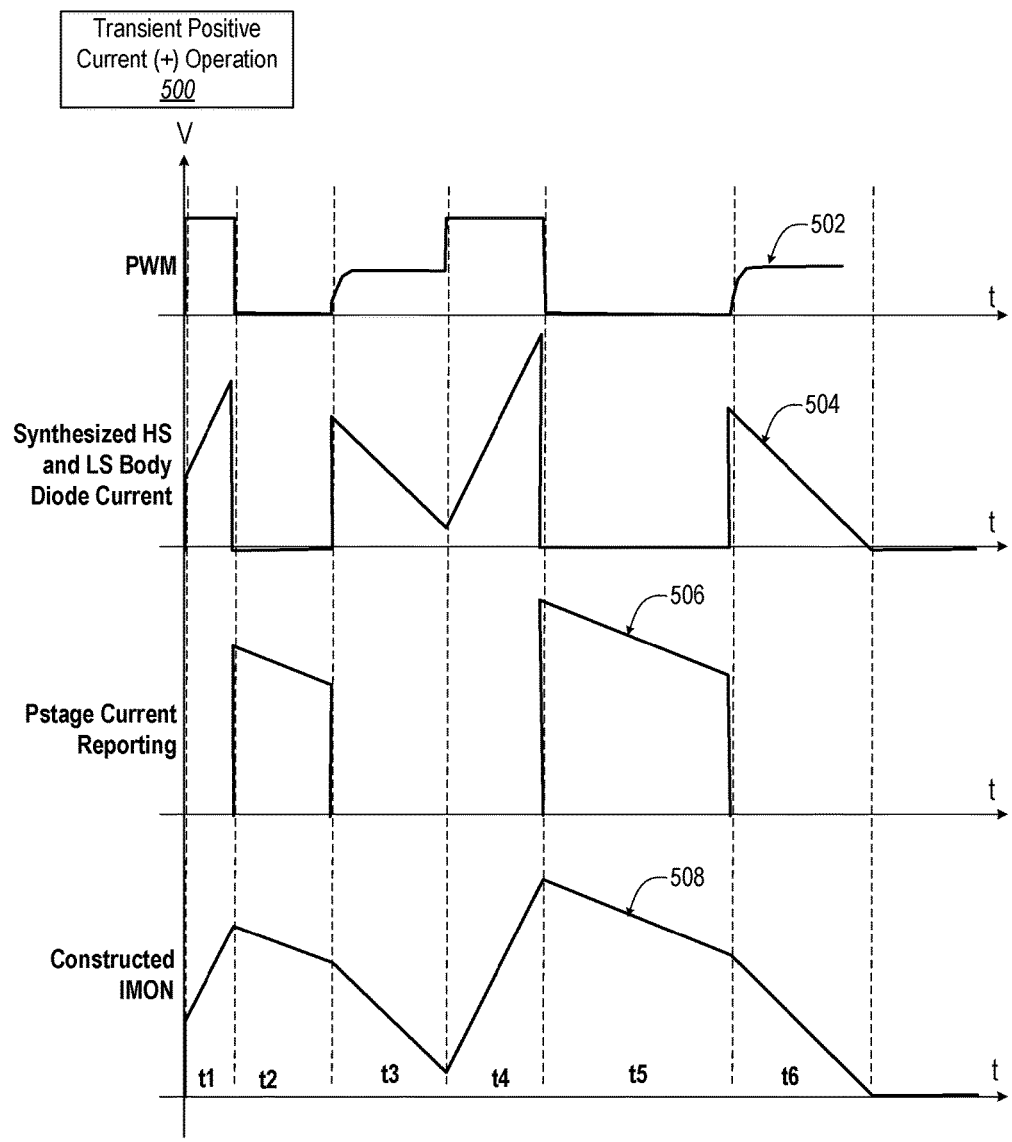
FIG. 5 illustrates graphical plots of a third scenario of current synthesis during transient operation with positive load current, according to one or more embodiments.

FIG. 5 illustrates current synthesis during LS body diode conduction that is transient with still positive load current operation 500. Presented within FIG. 5 are a PWM plot 502, a synthesized HS current plot 504, a Pstage current reporting plot 506, and a constructed IMON plot 508. When the VR is in transient operation, there are scenarios such as body-brake in which the LS body diode is conducting current. Due to the limitation of RDS (on) current sense scheme, only the current flows through the channel can be measured and reported. Thus the VR controller needs to synthesize the current waveform during LS body diode ON as well. During each Pstage current reporting cycle (t2, t5), the controller calculates and updates the inductance value as described before in CCM. During PWM ON period (t1, t4), the controller uses VIN, VOUT, the updated inductance value, and PWM ON time to synthesize the inductor up slope. During PWM Hi-z time period (t3, t6), the VR controller uses VOUT+Vsd (programmed diode voltage drop), inductance, and PWM Hi-z time to synthesize inductor current.

Figure 6:
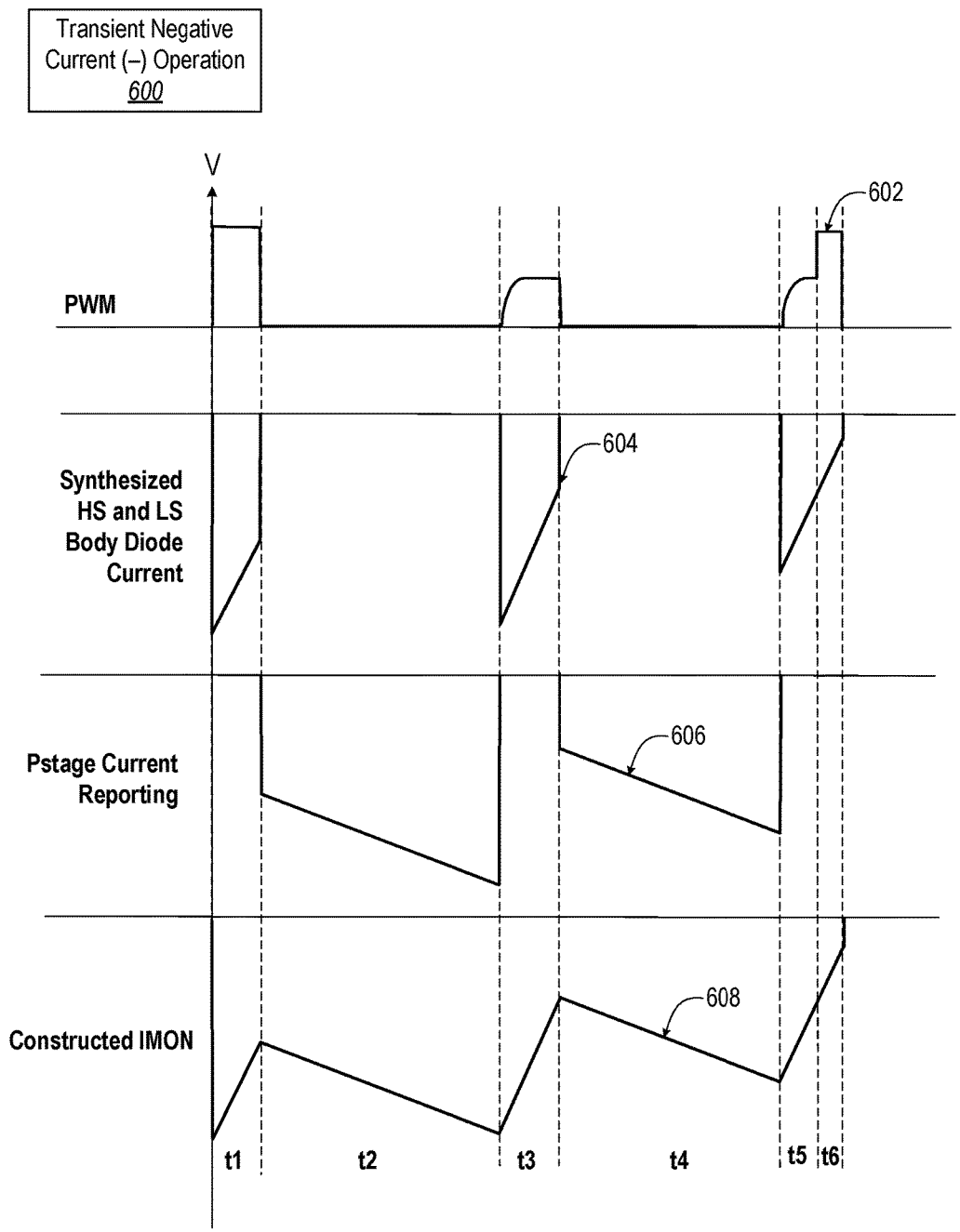
FIG. 6 illustrates graphical plots of a fourth scenario of current synthesis during transient operation with negative load current, according to one or more embodiments.

FIG. 6 illustrates current synthesis during HS body diode conduction that is transient with negative load current operation 600. Presented within FIG. 6 are a PWM plot 602, a synthesized HS current plot 604, a Pstage current reporting plot 606, and a constructed IMON plot 608. When VR is in dynamic VID down operation or triggering negative current limits, HS body diode can conduct current in certain instances. Due to limitations of RDS (on) current sense scheme, only the current flowing through the channel can be reported. Thus, a need exists for the VR controller 230 (FIG. 2) to synthesize the current waveform during HS body diode ON (t3, t6) as well. During each Pstage current reporting cycle (t2, t4), the VR controller 230 (FIG. 2) computes and updates the inductance value as described for CCM. During PWM ON period (t1, t6), the VR controller 230 (FIG. 2) uses VIN, VOUT, updated inductance, and PWM ON time to synthesize the inductor up slope. During PWM Hi-z time period (t3, t5), the VR controller 230 (FIG. 2) uses VIN+Vsd (programmed diode voltage drop), VOUT, the updated inductance value, and PWM Hi-z time to synthesize inductor current.

Figure 7:
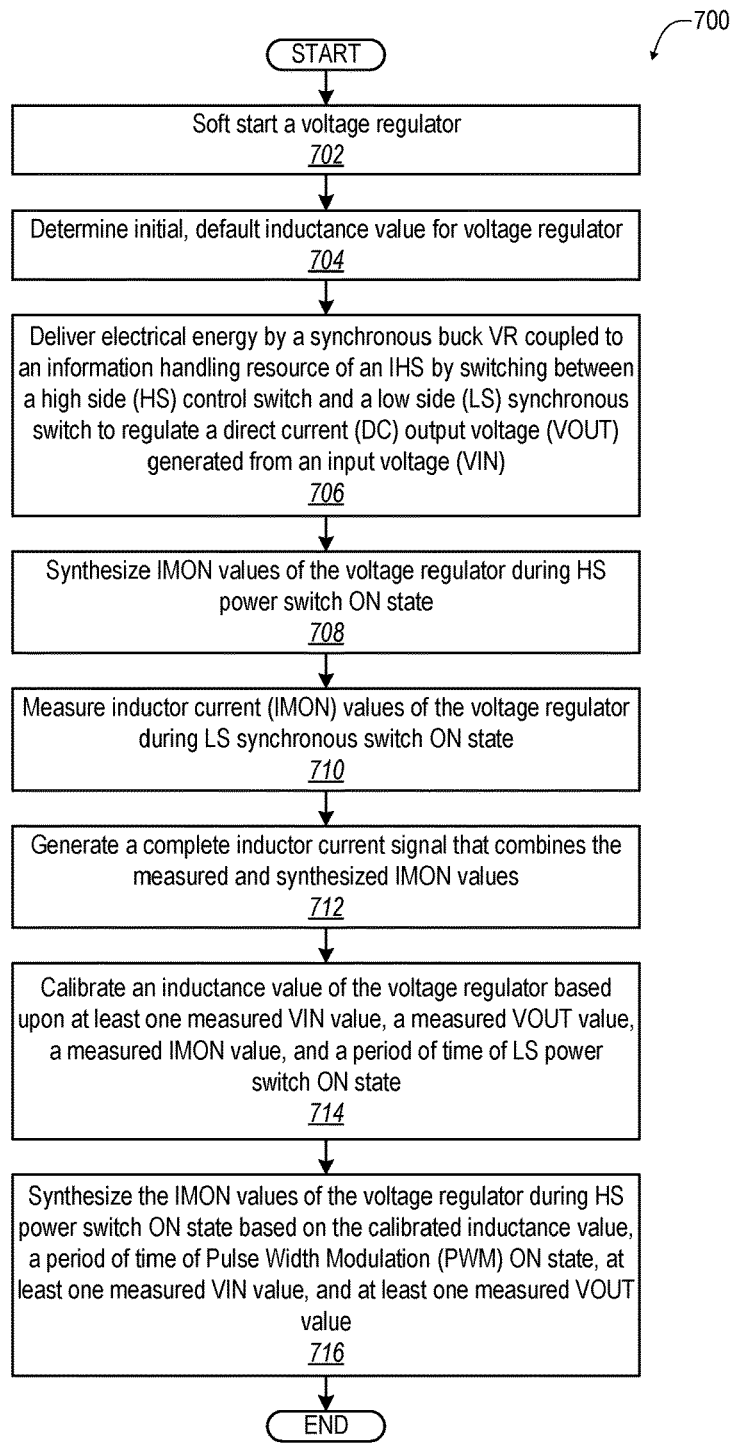
FIG. 7 illustrates a flow diagram of a method of performing/implementing a cost-effective current sense scheme for MOSFET RDS (on) sense based VR, according to one or more embodiments.
Figure 8A:
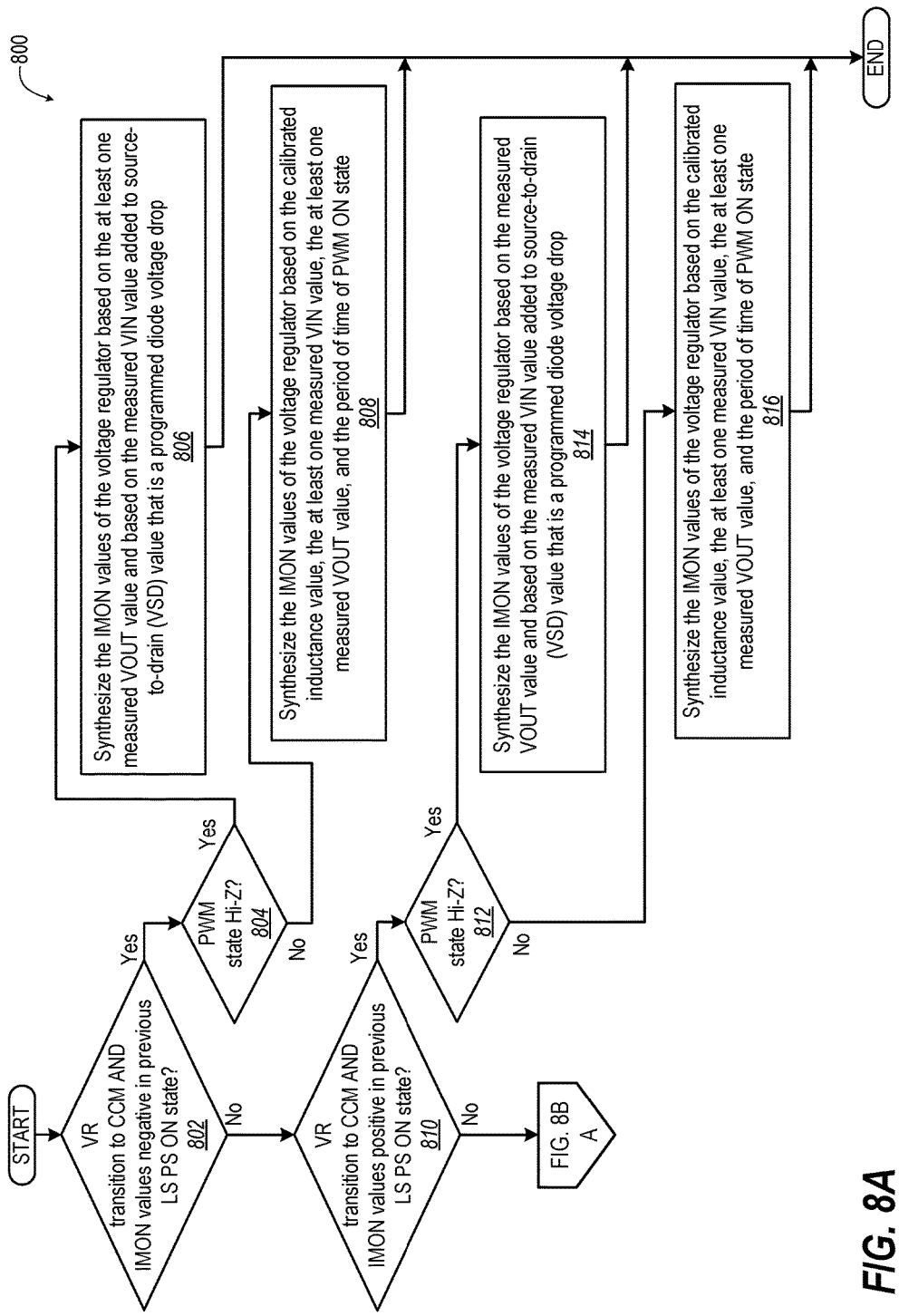
FIGS. 8A-8B illustrate a flow diagram of a method of emulating IMON values for certain states of the VR, according to one or more embodiments.
Figure 8B:
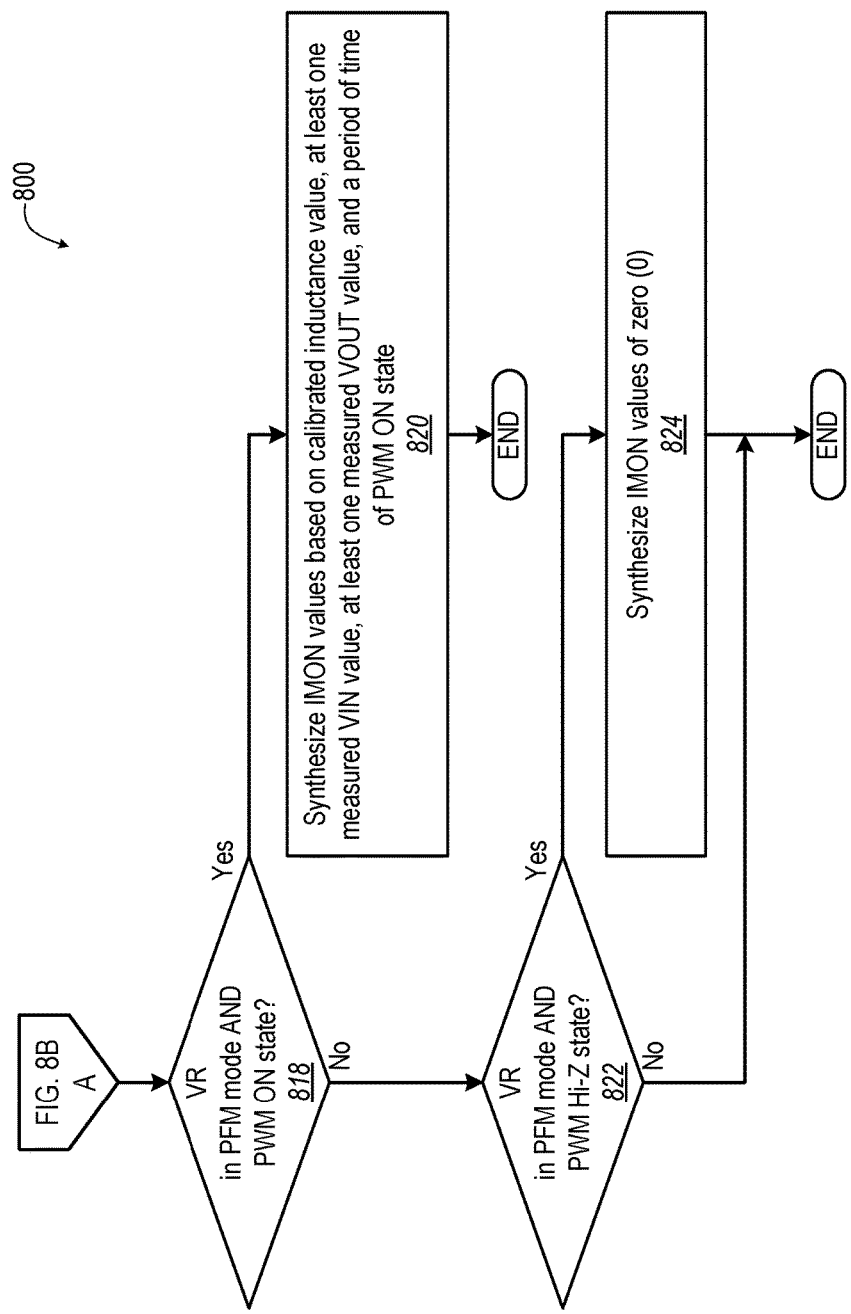

FIGS. 7 and 8A-8B illustrate flowcharts of exemplary methods 700, 800 by which VR controller 115 (FIG. 1) and/or an IHS 100 (FIG. 1) performs different aspects of the processes that enable the one or more embodiments of the disclosure. Generally, methods 700, 800 represent computer-implemented methods. The description of methods 700, 800 is provided with general reference to the specific components illustrated within FIGS. 1-2. Generally methods 700, 800 are described as being implemented via VR controller 230 (FIG. 2).

FIG. 7 illustrates a method 700 of implementing/providing a cost-effective current sense scheme for MOSFET RDS (on) sense based VR having one or more power stages. In one or more embodiments, the method 700 includes a VR controller soft starting the VR, such as a synchronous buck VR (block 702). The VR controller determines initial, default inductance value for the VR (block 704). The method 700 includes delivering electrical energy by a VR coupled to an information handling resource of an IHS by switching between a high side (HS) control switch and a low side (LS) synchronous switch to regulate a direct current (DC) output voltage (VOUT) generated from an input voltage (VIN) (block 706). The method 700 includes VR controller synthesizing IMON values of the voltage regulator during HS power switch ON state (block 708). The method 700 includes a current sensor measuring inductor current (IMON) values of the VR during LS synchronous switch ON state (block 710). The method 700 includes the VR controller generating a complete inductor current signal that combines the measured IMON values received from the current sensor during LS power switch ON time and IMON values synthesized by the VR controller during HS power switch ON time (block 712). The method 700 includes calibrating an estimate of the inductance value of the VR by the VR controller each switching cycle based upon at least one measured VIN value, a measured VOUT value, a measured IMON value, and a period of time of LS power switch ON state (block 714). The method 700 includes the VR controller synthesizing the IMON values of the voltage regulator during HS power switch ON state based on the calibrated inductance value, a period of time of Pulse Width Modulation (PWM) ON state, at least one measured VIN value, and at least one measured VOUT value (block 716). Then method 700 ends.

FIGS. 8A-8B illustrate a method of 800 of synthesizing IMON values for certain states of the VR. In the illustrative embodiments of the flow chart, the method 800 includes determining whether the synchronous buck VR is in transition to continuous conduction mode (CCM) and whether the measured IMON values in the previous LS power switch ON state is negative load current (decision block 802). In response to determining that the synchronous buck VR is in transition to CCM and the measured IMON values in the previous LS power switch ON state are negative, the method 800 includes a further determination of whether PWM state is high impedance (Hi-Z) (decision block 804). In response to determining, in decision block 804, that the PWM state is Hi-Z, the method 800 includes synthesizing the IMON values of the voltage regulator based on the at least one measured VOUT value and based on the measured VIN value added to source-to-drain (VSD) value, which is a programmed diode voltage drop (block 806). Then method 800 ends. In response to determining that the PWM state is not Hi-Z, the method 800 includes synthesizing the IMON values of the voltage regulator based on the calibrated inductance value, the at least one measured VIN value, the at least one measured VOUT value, and the period of time of PWM ON state (block 808). Then method 800 ends.

In response to determining, in decision block 802, that the synchronous buck VR is either not in transition to CCM or that the measured IMON values in the previous LS power switch ON state are not negative, the method 800 includes determining whether both the synchronous buck VR is in transition to continuous conduction mode (CCM) and the measured IMON value in the previous LS power switch ON state is a positive load current (decision block 810). In response to determining that the synchronous buck VR is in transition to CCM and the measured IMON value in the previous LS power switch ON state is positive, the method 800 includes the VR controller determining whether the PWM state is high impedance (Hi-Z) (decision block 812). In response to determining that the PWM state is Hi-Z, the method 800 includes the VR controller synthesizing the IMON values of the voltage regulator based on the measured VOUT value added to source-to-drain (VSD) value that is a programmed diode voltage drop (block 814). Then method 800 ends. In response to determining that the PWM state is not Hi-Z in decision block 812, the method 800 includes synthesizing the IMON values of the voltage regulator based on the calibrated inductance value, the at least one measured VIN value, the at least one measured VOUT value, and the period of time of PWM ON state (block 816). Then method 800 ends.

In response to determining either that the synchronous buck VR is not in transition to method 800 includes determining whether the synchronous buck VR is in pulse frequency modulation (PFM) mode and PWM ON state (decision block 818). In response to determining that the synchronous buck VR is in PFM mode and PWM ON state, method 800 includes synthesizing IMON values based on calibrated inductance value, at least one measured VIN value, at least one measured VOUT value, and a period of time of PWM ON state (block 820). Then method 800 ends.

In response to determining in decision block 818 that either the synchronous buck VR is not in PFM mode or that PWM is not in the ON state, the method 800 includes determining whether the synchronous buck VR is in PFM mode and PWM high impedance (Hi-Z) state (decision block 822). In response to determining that the synchronous buck VR is in PFM mode and PWM Hi-Z state, the method 800 includes synthesizing IMON values of zero (0) (block 824). Then method 800 ends. In response to determining that the synchronous buck VR is not both in PFM mode and PWM ON state in decision block 818, method 800 ends.

In the above described flow charts of FIG. 7-8, one or more of the methods may be embodied in VR controller that performs a series of functional processes. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An Information Handling System (IHS) comprising:
an information handling resource;
a synchronous buck voltage regulator (VR) coupled to the information handling resource to deliver electrical energy to the information handling resource by switching between a high side (HS) control switch and a low side (LS) synchronous switch to regulate a direct current (DC) output voltage (VOUT) generated from a DC input voltage (VIN); and
a VR controller coupled to the voltage regulator, and which:
    measures at least one inductor current (IMON) value of the voltage regulator during LS synchronous switch ON state;
    synthesizes one or more IMON values of the voltage regulator during HS power switch ON state based on the calibrated inductance value, a period of time of Pulse Width Modulation (PWM) ON state, at least one measured VIN value, and at least one measured VOUT value; and
    generates a complete IMON signal that combines the measured and synthesized IMON values.

2. The IHS of claim 1, wherein:
the voltage regulator comprises at least one power stage, each comprising:
    an inductor electrically connected between a phase node and an output node;
    a capacitor electrically connected between the output node and ground;
    the HS control switch electrically connected between a power supply and the phase node;
    the LS synchronous switch electrically connected between a ground and the phase node;
    a load current sensor electrically connected to the phase node to detect a load current value; and
    an output voltage sensor electrically connected across the output node and the ground to detect a VOUT value; and
the VR controller is electrically connected with the HS control switch and the LS synchronous switch and is in electrical communication with the load current sensor and the output voltage sensor to regulate the VOUT value across the capacitor by switching on and off the HS control switch and the LS synchronous switch to cause an inductor current ripple through the inductor.

3. The IHS of claim 1, wherein the VR controller:
calibrates an inductance value of the voltage regulator based upon at least one measured VIN value, a measured VOUT value, a measured IMON value, and a period of time of LS power switch ON state; and
synthesizes the IMON values of the voltage regulator during HS and LS power switch OFF states based on the calibrated inductance value, a period of time of PWM OFF state, at least one measured VIN value, and at least one measured VOUT value.

4. The IHS of claim 3, wherein the VR controller:
determines whether the synchronous buck VR is in transition to continuous conduction mode (CCM) and measured IMON values in previous LS power switch ON state is negative flowing from the load; and
in response to determining that the synchronous buck VR is in transition to CCM and the measured IMON values in the previous LS power switch ON state are negative:

determines whether PWM state is high impedance (Hi-Z);
in response to determining that the PWM state is not Hi-Z, synthesizes the IMON values of the voltage regulator based on the calibrated inductance value, the at least one measured VIN value, the at least one measured VOUT value, and the period of time of PWM ON state; and
in response to determining that the PWM state is Hi-Z, synthesizes the IMON values of the voltage regulator based on the at least one measured VOUT value and based on the measured VIN value added to source-to-drain (VSD) value that is a programmed diode voltage drop.

5. The IHS of claim 3, wherein the VR controller:
determines whether the synchronous buck VR is in transition to continuous conduction mode (CCM) and measured IMON value in previous LS power switch ON state is positive flowing into load; and in response to determining that the synchronous buck VR is in transition to CCM and the measured IMON value in the previous LS power switch ON state is positive:
determines whether the PWM state is high impedance (Hi-Z);
in response to determining that the PWM state is not Hi-Z, synthesizes the IMON values of the voltage regulator based on the calibrated inductance value, the at least one measured VIN value, the at least one measured VOUT value, and the period of time of PWM ON state; and
in response to determining that the PWM state is Hi-Z, synthesizes the IMON values of the voltage regulator based on the measured VOUT value and based on the measured VIN value added to source-to-drain (VSD) value that is a programmed diode voltage drop.

6. The IHS of claim 3, wherein the controller:
determines whether the synchronous buck VR is in pulse frequency modulation (PFM) mode and PWM ON state; and
in response to determining that the synchronous buck VR is in PFM mode and PWM ON state, synthesizes IMON values based on calibrated inductance value, at least one measured VIN value, at least one measured VOUT value, and a period of time of PWM ON state.

7. The IHS of claim 3, wherein the controller:
determines whether the synchronous buck VR is in PFM mode and PWM high impedance (Hi-Z) state; and
in response to determining that the synchronous buck VR is in PFM mode and PWM Hi-Z state, synthesizes IMON values of zero (0).

8. A direct current (DC) power supply system comprising:
a synchronous buck voltage regulator (VR) coupled to an information handling resource to deliver electrical energy to the information handling resource by switching between a high side (HS) control switch and a low side (LS) synchronous switch to regulate a direct current (DC) output voltage (VOUT) generated from a DC input voltage (VIN); and
a VR controller coupled to the voltage regulator, and which:
measures at least one inductor current (IMON) value of the voltage regulator during LS synchronous switch ON state;
synthesizes one or more IMON values of the voltage regulator during HS power switch ON state based on the calibrated inductance value, a period of time of Pulse Width Modulation (PWM) ON state, at least one measured VIN value, and at least one measured VOUT value; and
generates a complete IMON signal that combines the measured and synthesized IMON values.

9. The DC power supply system of claim 8, wherein:
the voltage regulator comprises at least one power stage, each comprising:
an inductor electrically connected between a phase node and an output node;
a capacitor electrically connected between the output node and ground;
the HS control switch electrically connected between a power supply and the phase node;
the LS synchronous switch electrically connected between a ground and the phase node;
a load current sensor electrically connected to the phase node to detect a load current value; and
an output voltage sensor electrically connected across the output node and the ground to detect a VOUT value; and
the VR controller is electrically connected with the HS control switch and the LS synchronous switch and is in electrical communication with the load current sensor and the output voltage sensor to regulate the VOUT value across the capacitor by switching on and off the HS control switch and the LS synchronous switch to cause an inductor current ripple through the inductor.

10. The DC power system of claim 8, wherein the VR controller:
calibrates an inductance value of the voltage regulator based upon at least one measured VIN value, a measured VOUT value, a measured IMON value, and a period of time of LS power switch ON state; and
synthesizes the IMON values of the voltage regulator during HS and LS power switch OFF states based on the calibrated inductance value, a period of time of PWM OFF state, at least one measured VIN value, and at least one measured VOUT value.

11. The DC power supply system of claim 10, wherein the VR controller:
determines whether the synchronous buck VR is in transition to continuous conduction mode (CCM) and measured IMON values in previous LS power switch ON state is negative flowing from the load; and
in response to determining that the synchronous buck VR is in transition to CCM and the measured IMON values in the previous LS power switch ON state are negative:
determines whether PWM state is high impedance (Hi-Z);
in response to determining that the PWM state is not Hi-Z, synthesizes the IMON values of the voltage regulator based on the calibrated inductance value, the at least one measured VIN value, the at least one measured VOUT value, and the period of time of PWM ON state; and
in response to determining that the PWM state is Hi-Z, synthesizes the IMON values of the voltage regulator based on the at least one measured VOUT value and based on the measured VIN value added to source-to-drain (VSD) value that is a programmed diode voltage drop.

12. The DC power supply system of claim 10, wherein the VR controller:
determines whether the synchronous buck VR is in transition to continuous conduction mode (CCM) and measured IMON value in previous LS power switch ON state is positive flowing into load; and in response to determining that the synchronous buck VR is in transition to CCM and the measured IMON value in the previous LS power switch ON state is positive:
- determines whether the PWM state is high impedance (Hi-Z);
- in response to determining that the PWM state is not Hi-Z, synthesizes the IMON values of the voltage regulator based on the calibrated inductance value, the at least one measured VIN value, the at least one measured VOUT value, and the period of time of PWM ON state; and
- in response to determining that the PWM state is Hi-Z, synthesizes the IMON values of the voltage regulator based on the measured VOUT value and based on the measured VIN value added to source-to-drain (VSD) value that is a programmed diode voltage drop.

13. The DC power supply system of claim 10, wherein the controller:
- determines whether the synchronous buck VR is in pulse frequency modulation (PFM) mode and PWM ON state; and
- in response to determining that the synchronous buck VR is in PFM mode and PWM ON state, synthesizes IMON values based on calibrated inductance value, at least one measured VIN value, at least one measured VOUT value, and a period of time of PWM ON state.

14. The DC power supply system of claim 10, wherein the controller:
- determines whether the synchronous buck VR is in PFM mode and PWM high impedance (Hi-Z) state; and
- in response to determining that the synchronous buck VR is in PFM mode and PWM Hi-Z state, synthesizes IMON values of zero (0).

15. A method comprising:
- delivering electrical energy by a synchronous buck voltage regulator (VR) coupled to an information handling resource of an information handling system by switching between a high side (HS) control switch and a low side (LS) synchronous switch to regulate a direct current (DC) output voltage (VOUT) generated from an input voltage (VIN);
- measuring inductor current (IMON) values of the voltage regulator during LS synchronous switch ON state;
- synthesizing IMON values of the voltage regulator during HS power switch ON state based on the calibrated inductance value, a period of time of Pulse Width Modulation (PWM) ON state, at least one measured VIN value, and at least one measured VOUT value; and
- generating a complete inductor current signal that combines the measured and synthesized IMON values.

16. The method of claim 15, further comprising:
- calibrating an inductance value of the voltage regulator based upon at least one measured VIN value, a measured VOUT value, a measured IMON value, and a period of time of LS power switch ON state; and
- synthesizing the IMON values of the voltage regulator during HS and LS power switch OFF states based on the calibrated inductance value, a period of time of PWM OFF state, at least one measured VIN value, and at least one measured VOUT value.

17. The method of claim 16, further comprising:
- determining whether the synchronous buck VR is in transition to continuous conduction mode (CCM) and measured IMON values in previous LS power switch ON state is negative flowing from the load; and
- in response to determining that the synchronous buck VR is in transition to CCM and the measured IMON values in the previous LS power switch ON state are negative:
  - determining whether PWM state is high impedance (Hi-Z);
  - in response to determining that the PWM state is not Hi-Z, synthesizing the IMON values of the voltage regulator based on the calibrated inductance value, the at least one measured VIN value, the at least one measured VOUT value, and the period of time of PWM ON state; and
  - in response to determining that the PWM state is Hi-Z, synthesizing the IMON values of the voltage regulator based on the at least one measured VOUT value and based on the measured VIN value added to source-to-drain (VSD) value that is a programmed diode voltage drop.

18. The method of claim 16, further comprising:
- determining whether the synchronous buck VR is in transition to continuous conduction mode (CCM) and measured IMON value in previous LS power switch ON state is positive flowing into load; and
- in response to determining that the synchronous buck VR is in transition to CCM and the measured IMON value in the previous LS power switch ON state is positive:
  - determining whether the PWM state is high impedance (Hi-Z);
  - in response to determining that the PWM state is not Hi-Z, synthesizing the IMON values of the voltage regulator based on the calibrated inductance value, the at least one measured VIN value, the at least one measured VOUT value, and the period of time of PWM ON state; and
  - in response to determining that the PWM state is Hi-Z, synthesizing the IMON values of the voltage regulator based on the measured VOUT value and based on the measured VIN value added to source-to-drain (VSD) value that is a programmed diode voltage drop.

19. The method of claim 16, further comprising:
- determining whether the synchronous buck VR is in pulse frequency modulation (PFM) mode and PWM ON state; and
- in response to determining that the synchronous buck VR is in PFM mode and PWM ON state, synthesizing IMON values based on calibrated inductance value, at least one measured VIN value, at least one measured VOUT value, and a period of time of PWM ON state.

20. The method of claim 16, further comprising:
- determining whether the synchronous buck VR is in PFM mode and PWM high impedance (Hi-Z) state; and
- in response to determining that the synchronous buck VR is in PFM mode and PWM Hi-Z state, synthesizing IMON values of zero (0).

* * * * *